(12) United States Patent
Strandborg et al.

(10) Patent No.: US 12,640,069 B1
(45) Date of Patent: May 26, 2026

(54) DETECTION AND MITIGATION OF DEFECTS IN MULTISCOPIC DISPLAYS

(71) Applicant: Distance Technologies Oy, Helsinki (FI)

(72) Inventors: Mikko Strandborg, Hangonkylä (FI); Petteri Timonen, Helsinki (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 19/314,335

(22) Filed: Aug. 29, 2025

Related U.S. Application Data

(63) Continuation of application No. 19/260,814, filed on Jul. 7, 2025.

(51) Int. Cl.
| | |
|---|---|
| *G09G 3/00* | (2006.01) |
| *H04N 13/32* | (2018.01) |
| *H04N 13/324* | (2018.01) |
| *H04N 13/327* | (2018.01) |
| *H04N 13/398* | (2018.01) |

(52) U.S. Cl.
CPC ............. *G09G 3/006* (2013.01); *G09G 3/001* (2013.01); *H04N 13/32* (2018.05); *H04N 13/324* (2018.05); *H04N 13/327* (2018.05); *H04N 13/398* (2018.05); *G09G 2320/0626* (2013.01); *G09G 2320/0666* (2013.01); *G09G 2330/10* (2013.01); *G09G 2330/12* (2013.01); *G09G 2354/00* (2013.01)

(58) Field of Classification Search
CPC .................. G09G 3/006; G09G 3/001; G09G 2320/0626; G09G 2320/0666; G09G 2330/10; G09G 2330/12; G09G 2354/00; H04N 13/327; H04N 13/32; H04N 13/324; H04N 13/398
See application file for complete search history.

(56) References Cited

U.S. PATENT DOCUMENTS

| | | | | |
|---|---|---|---|---|
| 11,689,709 B2* | 6/2023 | Valli | ..................... | H04N 13/344 348/51 |
| 12,367,638 B1* | 7/2025 | Dehkordi | ................ | G06T 15/00 |
| 2023/0127218 A1* | 4/2023 | Hsieh | ................... | G06V 10/764 382/100 |
| 2024/0385436 A1* | 11/2024 | Dehkordi | ........... | G02B 27/0101 |
| 2025/0104580 A1* | 3/2025 | Melax | ..................... | G06T 11/00 |

* cited by examiner

*Primary Examiner* — Jin Cheng Wang
(74) *Attorney, Agent, or Firm* — Ziegler IP Law Group, LLC.

(57) ABSTRACT

A defective sub-region of a display area of a multiscopic display is identified based on a comparison between an actual captured image of the display area and an expected image of the display area that is expected to be captured during display of a first multiscopic image. When it is determined that the defective sub-region overlaps at least partially with a sub-region of the display area to be used to present a virtual object, another sub-region of the display area that does not overlap with the defective sub-region is identified. The virtual object is relocated within a second multiscopic image to use the another sub-region for presenting the virtual object. The second multiscopic image is then displayed after the relocation of the virtual object.

18 Claims, 2 Drawing Sheets

DETECTION AND MITIGATION OF DEFECTS IN MULTISCOPIC DISPLAYS

TECHNICAL FIELD

The present disclosure relates to systems for detecting and mitigating defects in multiscopic displays. The present disclosure also relates to methods for detecting and mitigating defects in multiscopic displays.

BACKGROUND

Multiscopic displays direct distinct images to different eyes, enabling a user to perceive depth without the need for a head-worn device. Such displays typically include a multiscopic optical element (for example, such as a lenticular array or a parallax barrier) that directs light from a display panel toward different viewing positions. These displays rely on a precise optical alignment and a uniform optical behaviour across an entire display surface to deliver consistent multiscopic performance.

However, in real-world applications, especially in rugged conditions such as those encountered in vehicles, the optical quality of multiscopic displays may degrade over time. A multiscopic display may include minute sub-regions where the optical behaviour deviates significantly from an expected light distribution behaviour. For example, a lenticular array may include manufacturing defects that manifest as thin stripes, often caused during detachment of the lenticular array from a mould, when certain portions of the lenticular array stick partially to a mould surface. These fabrication anomalies result in light being emitted in unpredictable directions, thereby disrupting an intended directional control.

In addition to manufacturing defects, other forms of damage may occur throughout the lifetime of the multiscopic display. The multiscopic display may acquire cracks, scratches, or foreign material contamination (such as dust or liquid ingress), which scatter or absorb light in unintended ways. Such defects are especially likely in vehicular deployments or other environments subject to vibration, temperature fluctuation, or mechanical stress.

Defective sub-regions of the multiscopic optical element degrade the local multiscopic behaviour of the multiscopic display. Instead of directing light precisely toward the intended viewpoints, these defective sub-regions may emit light diffusely or in misaligned directions. As a result, the user may perceive visual artifacts such as ghosting, loss of depth cues, degraded resolution, or dark patches in a three-dimensional (3D) visual scene.

Conventional multiscopic rendering pipelines assume ideal optical conditions and lack mechanisms to detect or respond to such defects. Therefore, there is a need for systems and methods that not only detect defective sub-regions in a multiscopic display, but also mitigate their visual impact.

SUMMARY

The present disclosure seeks to provide an improved system and method for defect detection and mitigation in a multiscopic display. The aim of the present disclosure is achieved by a system and a method in which defective sub-regions of a multiscopic display are detected by comparing captured images of the display with expected images generated based on a camera position, and visual artifacts are mitigated by dynamically adapting multiscopic rendering through relocation of virtual content away from defective sub-regions, thereby preserving the integrity of a three-dimensional visual scene despite the presence of defects, as defined in the appended independent claims to which reference is made. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1A:
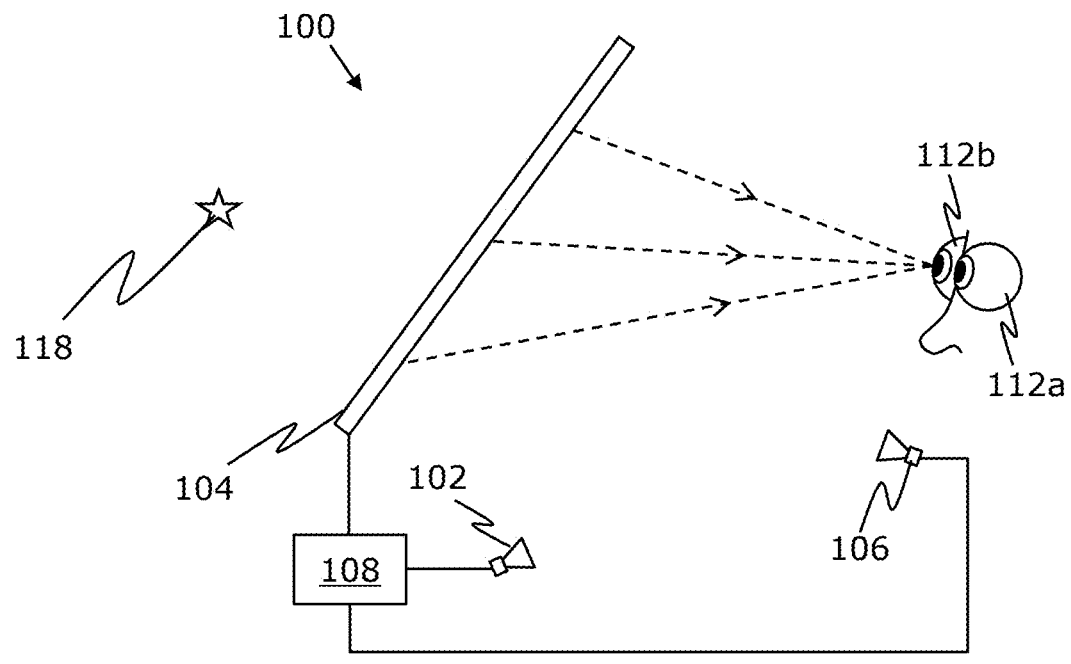
FIGS. 1A and 1B are schematic illustrations of a system for detecting and mitigating defects in a multiscopic display, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising:

a tracker;

a multiscopic display;

at least one camera that is positioned such that a display area of the multiscopic display lies within a field of view of the at least one camera at least partially; and at least one processor configured to:

perform calibration to determine at least one parameter of a multiscopic optical element of the multiscopic display;

determine respective optical locations of eyes of at least one user relative to the display area, using the tracker;

determine or retrieve an optical location of the at least one camera relative to the display area;

generate or retrieve respective images to be directed toward the eyes of the at least one user, based on the respective optical locations of the eyes relative to the display area;

generate a first multiscopic image to be displayed via the multiscopic display, based on the respective images for the eyes of the at least one user, and the at least one parameter of the multiscopic optical element;

display the first multiscopic image via the multiscopic display, whilst capturing at least one image of the display area using the at least one camera;

calculate at least one expected image of the display area that is expected to be captured by the at least one camera during display of the first multiscopic image, based on the first multiscopic image, the at least one parameter of the multiscopic optical element, the respective optical locations of the eyes relative to the display area, and the optical location of the at least one camera relative to the display area;

identify at least one defective sub-region of the display area, based on a comparison between the at least one expected image and the at least one captured image of the display area;

determine whether the at least one defective sub-region overlaps at least partially with a sub-region of the display area to be used to present at least one virtual object, based on a location of the at least one virtual object in a second multiscopic image; and when it is determined that the at least one defective sub-region overlaps at least partially with the sub-region to be used to present the at least one virtual object, identify another sub-region of the display area that does not overlap with the at least one defective sub-region;

relocate the at least one virtual object within the second multiscopic image to use the another sub-region for presenting the at least one virtual object; and display the second multiscopic image after relocating the at least one virtual object.

In a second aspect, an embodiment of the present disclosure provides a method comprising:

performing calibration to determine at least one parameter of a multiscopic optical element of a multiscopic display;

determining respective optical locations of eyes of at least one user relative to a display area of the multiscopic display, using a tracker;

determining or retrieving an optical location of at least one camera relative to the display area, wherein the at least one camera is positioned such that the display area of the multiscopic display lies within a field of view of the at least one camera at least partially;

generating or retrieving respective images to be directed toward the eyes of the at least one user, based on the respective optical locations of the eyes relative to the display area;

generating a first multiscopic image to be displayed via the multiscopic display, based on the respective images for the eyes of the at least one user, and the at least one parameter of the multiscopic optical element;

displaying the first multiscopic image via the multiscopic display, whilst capturing at least one image of the display area using the at least one camera;

calculating at least one expected image of the display area that is expected to be captured by the at least one camera during display of the first multiscopic image, based on the first multiscopic image, the at least one parameter of the multiscopic optical element, the respective optical locations of the eyes relative to the display area, and the optical location of the at least one camera relative to the display area;

identifying at least one defective sub-region of the display area, based on a comparison between the at least one expected image and the at least one captured image of the display area;

determining whether the at least one defective sub-region overlaps at least partially with a sub-region of the display area to be used to present at least one virtual object, based on a location of the at least one virtual object in a second multiscopic image; and when it is determined that the at least one defective sub-region overlaps at least partially with the sub-region to be used to present the at least one virtual object, identifying another sub-region of the display area that does not overlap with the at least one defective sub-region;

relocating the at least one virtual object within the second multiscopic image to use the another sub-region for presenting the at least one virtual object; and displaying the second multiscopic image after relocating the at least one virtual object.

The present disclosure provides the aforementioned system and the aforementioned method for defect detection and mitigation in a multiscopic display, wherein at least one defective sub-region of a display area is identified by comparing at least one expected image of the display area with at least one image captured by the at least one camera during display of the first multiscopic image. By performing calibration to determine the at least one parameter of the multiscopic optical element, and by generating the first multiscopic image based on the respective images to be directed toward the eyes of the at least one user and the at least one parameter of the multiscopic optical element, the system and method enable generation of an expected optical output from the multiscopic display under known viewing conditions. A comparison between the at least one expected image and the at least one captured image of the display area allows for reliable identification of the at least one defective sub-region where an optical behaviour deviates from an expected light distribution behaviour. Because the identification of the at least one defective sub-region is based on image comparison rather than hardware-based defect sensing, the system and method are inherently adaptable to a wide range of defect types, including optical misalignments, partial damage, or contamination, without requiring prior knowledge of defect characteristics. When it is determined that the at least one defective sub-region overlaps at least partially with a sub-region of the display area to be used to present at least one virtual object, the system and method relocate the at least one virtual object to another sub-region of the display area that does not overlap with the at least one defective sub-region. This allows the at least one virtual object to be presented in a visually functional sub-region of the display area, thereby preserving the integrity of a three-dimensional (3D) visual scene despite the presence of defects in the multiscopic display. The system and method operate entirely through multiscopic image generation and do not require mechanical components or additional display hardware, making them suitable for real-time and resource-efficient implementations.

It will be appreciated that the system can be implemented as a heads-up display (HUD) in a vehicle. In some implementations, the multiscopic display may be implemented as a transparent display that is integrated into a windshield of the vehicle. One example of such a transparent display has been described in U.S. patent application Ser. No. 18/818, 717, titled "Augmenting Reality with Multiscopic See-through Display", which is incorporated herein by reference. In other implementations, the multiscopic display may be implemented as a non-transparent display along with an optical combiner integrated into the windshield. In such implementations, the optical combiner is arranged on an optical path of the non-transparent display and an optical path of a real-world light field of a real-world environment. Irrespective of the implementation of the multiscopic display, the at least one camera can be positioned to capture images of the display area directly and/or via reflection through a semi-reflective surface of the optical combiner. In other words, the field of view (FOV) of the at least one camera encompasses both a direct FOV and a reflected FOV. This flexibility in optical configuration enables the system to be integrated into both direct-view and combiner-based display architectures commonly used in vehicular applications, without requiring changes to the core defect detection and mitigation logic.

Depending on the implementation of the multiscopic display, the term "optical location" may refer to either a relative physical location or a relative virtual location. In implementations where no optical combiner is employed, the respective optical locations of the eyes of the at least one user and the optical location of the at least one camera may refer to corresponding relative locations with respect to the display area. In other implementations where an optical combiner is employed, the respective optical locations of the eyes of the at least one user and the optical location of the at least one camera may refer to corresponding relative virtual locations with respect to the display area via reflection through the optical combiner.

Moreover, optionally, the calibration is performed in a fully-automated manner without the need for any manual intervention. In some implementations, the calibration can even be performed on-the-fly, namely while the system is in use. Some example techniques for performing such automated calibration of the at least one parameter of the multiscopic optical element of the multiscopic display have been described in U.S. patent application Ser. No. 19/190, 945, titled "Automated Calibration of Multiscopic Displays", U.S. patent application Ser. No. 19/245,774, titled "Automated Calibration of Multiscopic Displays Using Frequency Domain", and U.S. patent application Ser. No. 19/258,260, titled "On-the-fly Automated Calibration of Multiscopic Displays", which are incorporated herein by reference.

The at least one expected image of the display area is calculated based on the first multiscopic image, the at least one parameter of the multiscopic optical element, the respective optical locations of the eyes of the at least one user, and the optical location of the at least one camera. In this regard, the at least one parameter may include one or more of: a pitch, an orientation, a phase, a thickness of the multiscopic optical element. Using the first multiscopic image and the at least one parameter of the multiscopic optical element, a simulation or optical projection may be performed to determine how light emitted by different sub-pixels of the multiscopic display is expected to propagate through the multiscopic optical element and reach the optical location of the at least one camera. This allows generation of the at least one expected image, representing how the display area is expected to appear from the optical location of the at least one camera under ideal operating conditions.

The comparison between the at least one expected image and the at least one captured image of the display area may be performed on a per-pixel basis or a per-sub-region basis. The comparison can be performed using any suitable difference metric that quantifies a deviation between corresponding segments of the at least one expected image and the at least one captured image. Examples of such a difference metric may include, but are not limited to: an absolute intensity difference, a squared error, a structural similarity index (SSIM), or a colour difference metric computed in a perceptually-uniform colour space. The difference metric may be computed independently for individual colour channels or aggregated across all the colour channels. Accordingly, sub-region(s) of the display area in which the deviation exceeds a predefined threshold may be identified as defective sub-region(s).

When it is determined that the at least one defective sub-region overlaps at least partially with the "original" sub-region to be used to present the at least one virtual object, the another sub-region of the display area can be identified for presenting the at least one virtual object, based on at least one of:

(i) a spatial proximity of the another sub-region to the original sub-region, (ii) whether a size of the another sub-region matches or exceeds a size of the original sub-region.

Subject to the size constraint, the another sub-region can be identified as one that lies in the spatial proximity of the original sub-region. This allows the location of the at least one virtual object to be modified within the 3D visual scene in a subtle manner, thereby reducing the perceptual impact of the relocation.

In this way, the first multiscopic image is used during the defect detection phase to estimate the optical behaviour under known viewing conditions, and the second multiscopic image is displayed after relocation of the at least one virtual object, to provide a corrected visual scene for presentation. Otherwise, when it is determined that the at least one defective sub-region does not overlap with the sub-region to be used to present the at least one virtual object, the second multiscopic image is displayed without the need for relocating the at least one virtual object.

Moreover, optionally, the at least one processor is configured to:

when it is determined that the at least one defective sub-region overlaps at least partially with the sub-region to be used to present the at least one virtual object, determine whether a virtual depth at which the at least one virtual object is to be presented lies within a predefined threshold range from a native optical distance of the multiscopic display; and when it is determined that the virtual depth lies within the predefined threshold range from the native optical distance, generate the second multiscopic image to present the at least one virtual object at the native optical distance.

In implementations where an optical combiner is employed, the native optical distance may be defined as a sum of: (i) a physical distance between the eyes of the at least one user and a semi-reflective surface of the optical combiner, and (ii) a physical distance between the semi-reflective surface and the multiscopic display, along a reflected line of sight. In implementations where no optical combiner is employed, the native optical distance may be defined as a physical distance between the eyes of the at least one user and the display area of the multiscopic display, along a direct line of sight. The predefined threshold range may, for example, lie within 5 centimetres (cm) to 20 cm of the native optical distance; more optionally, in a range of 5 cm to 10 cm of the native optical distance.

Such a visual relocation of the at least one virtual object in optical depth can be performed as an alternative to, or in combination with, spatial relocation of the at least one virtual object on the display area. This approach leverages a fact that defects in the multiscopic optical element primarily affect directional light control, which is most critical at virtual depths that are different from the native optical distance. By presenting the at least one virtual object at the native optical distance, the at least one virtual object is effectively presented to different eyes of the at least one user using the same sub-region of the display area, thereby producing a two-dimensional (2D) view of the at least one virtual object. Notably, the visual impact of the at least one defective sub-region is reduced. This enables defect mitigation even when the another sub-region on the display area is unavailable, thereby increasing the robustness and flexibility of the defect mitigation approach. Moreover, adjusting the virtual depth instead of the spatial position preserves the spatial consistency of the scene layout from the user's perspective, contributing to a more stable and comfortable viewing experience.

Furthermore, optionally, the at least one processor is configured to:

when it is determined that the at least one defective sub-region overlaps at least partially with the sub-region to be used to present the at least one virtual object, determine whether another sub-region of the display area that does not overlap with the at least one defective sub-region cannot be identified, or whether the at least one virtual object is not to be relocated; and when it is determined that another sub-region of the display area cannot be identified, or the at least one virtual object is not to be relocated, determine colours and intensities of pixels in a portion of the second multiscopic image to be displayed via the at least one defective sub-region; and adjust the colours and intensities of said pixels, such that deviations between the adjusted colours and intensities and original colours and intensities of said pixels lie within a predefined threshold deviation.

In this regard, whether another sub-region of the display area cannot be identified is determined based on at least one of: the size constraint, unavailability of any unoccupied sub-region in spatial proximity to the original sub-region. Whether the at least one virtual object is not to be relocated is determined based on whether the at least one virtual object is assigned a specific spatial location within a 3D view frustum of the at least one user. As an example, certain virtual objects (for example, such as speedometer and other critical instrumentation) are typically presented at a specific spatial location in the 3D view frustum to match the user's expectation of where such virtual objects should be presented.

When relocation is not performed, the colours and intensities of the aforesaid pixels are adjusted, such that they do not deviate more than the predefined threshold deviation from their original colours and intensities. This adjustment is particularly beneficial in implementations where the multiscopic optical element comprises a lenticular array, in which sub-pixels beneath a single lenticular lens may emit light in different directions and correspond to different eyes of the at least one user, and may exhibit significant variation in colour and/or intensity. In cases where the original colours and intensities of these pixels lie within approximately twice the predefined threshold deviation from each other, the colours and intensities can be adjusted to converge toward a compromise colour and intensity that lies with the predefined threshold deviation from each of the original colours and intensities.

Such adjustment enables visually acceptable rendering for multiple viewing directions, even in the presence of a defective sub-region. When the at least one virtual object is not relocated, this approach mitigates the visual impact of a defective sub-region without altering the intended spatial placement. This approach improves local colour and intensity consistency while minimizing perceptual distortion. By minimizing cumulative perceptual deviation across multiple viewing directions, the system distributes error in a visually optimal manner, reducing the likelihood of noticeable artifacts near defective sub-regions. As a result, the rendering remains perceptually stable and visually coherent even in shared or multi-user settings, thereby enhancing both individual and collective viewing experiences without requiring any hardware-level correction.

Moreover, when the at least one virtual object cannot be relocated away from the at least one defective sub-region (either due to spatial constraints or because the at least one virtual object is assigned a specific spatial location), user-specific gaze data can be leveraged to adapt rendering in a perceptually optimized manner. Optionally, in this regard, the at least one processor is configured to:

when it is determined that the at least one defective sub-region overlaps at least partially with the sub-region to be used to present the at least one virtual object, determine whether another sub-region of the display area that does not overlap with the at least one defective sub-region cannot be identified, or whether the at least one virtual object is not to be relocated; and when it is determined that another sub-region of the display area cannot be identified, or the at least one virtual object is not to be relocated, determine gaze directions of the eyes of the at least one user, using the tracker;

determine which eye of the at least one user is focused on the at least one defective sub-region, based on the gaze directions; and adjust colours and intensities of pixels in a portion of the second multiscopic image to be displayed via the at least one defective sub-region, based on colours and intensities of pixels in a corresponding portion of an image to be directed toward the determined eye, the corresponding portion presenting the at least one virtual object.

By determining which eye is focused on the at least one defective sub-region and adjusting the colors and intensities of the pixels in the portion of the second multiscopic image to be displayed via the at least one defective sub-region based on the image intended for the focused eye, it is ensured that the visual information most likely to be scrutinized is preserved with higher fidelity, while tolerating greater deviation in the non-focused eye. Such selective and asymmetric adjustment enhances perceptual coherence without requiring spatial relocation of the at least one virtual object. Furthermore, by aligning rendering correction with the user's gaze, the system prioritizes visual quality where it is perceptually most relevant, thereby improving the subjective visual experience despite the presence of optical defects. This approach is particularly effective in HUDs and other automotive contexts, where critical information must remain clearly visible and stable in the user's focal field even under degraded display conditions.

It will be appreciated that in some cases when the at least one virtual object cannot be relocated away from the at least one defective sub-region, and both eyes of the at least one user are determined to be focused on the at least one defective sub-region, a dominant-eye-based rendering approach can be employed to enhance visual fidelity. Optionally, in this regard, the at least one processor is configured to:

when it is determined that the at least one defective sub-region overlaps at least partially with the sub-region to be used to present the at least one virtual object, and when it is determined that another sub-region of the display area cannot be identified, or the at least one virtual object is not to be relocated, determine whether both the eyes of the at least one user are focused on the at least one defective sub-region; and when it is determined that both the eyes are focused on the at least one defective sub-region, determine a dominant eye of the at least one user; and adjust the colours and intensities of the pixels in the portion of the second multiscopic image to be displayed via the at least one defective sub-region, based on colours and intensities of pixels in a corresponding portion of an image to be directed toward the dominant eye, the corresponding portion presenting the at least one virtual object.

By determining the dominant eye of the at least one user and adjusting the colors and intensities of the pixels in said portion of the second multiscopic image (to be displayed via the at least one defective sub-region) based on the image intended for the dominant eye, it is ensured that the eye contributing most strongly to perceptual interpretation receives the highest visual accuracy. This approach leverages the well-established perceptual asymmetry in binocular vision, where the dominant eye typically plays a more influential role in spatial judgment and detail recognition. As a result, visual distortion caused by optical defects is minimized in the dominant perceptual pathway, enabling more stable and coherent rendering of critical virtual content.

This approach improves the perceptual resilience of the multiscopic display in scenarios where neither spatial relocation nor gaze-weighted redirection is feasible, offering an additional degree of visual optimization without requiring full-scene reconfiguration. Moreover, because rendering correction is performed selectively based on the dominant eye, the computational cost is significantly reduced compared to global image correction approaches. This makes the solution well-suited for real-time applications in constrained hardware environments. In particular, for HUDs and other safety-critical applications, this dominant-eye-weighted rendering ensures that critical visual information remains perceptually accurate and stable, even in the presence of localized optical degradation.

Furthermore, optionally, the at least one processor is configured to:

when it is determined that the at least one defective sub-region overlaps at least partially with the sub-region to be used to present the at least one virtual object, and when it is determined that another sub-region of the display area cannot be identified, or the at least one virtual object is not to be relocated, determine a portion of another image to be directed toward another eye of the at least one user, said portion presenting the at least one virtual object and being displayed via a non-defective sub-region of the display area; and increase intensities of pixels in said portion of the another image, prior to generating the second multiscopic image from the image to be directed toward the determined eye and the another image to be directed toward the another eye.

Said portion of the another image (that also presents the at least one virtual object) can be determined using various approaches. As an example, said portion of the another image can be determined based on a stereo convergence of the gaze directions of the eyes of the user. As another example, said portion of the another image can be determined based on the optical location of the another eye with respect to the display area, and depth information associated with the at least one virtual object.

By increasing the intensities of the pixels in the portion of the another image to be directed toward the another eye (that is displayed via a non-defective sub-region of the display area), a compensatory enhancement is achieved that offsets luminance distortion caused by the at least one defective sub-region. Such asymmetric intensity boosting preserves the visual prominence and clarity of the at least one virtual object, even when it cannot be relocated away from the at least one defective sub-region.

Such luminance compensation leverages the principle of binocular summation, where visual perception is influenced by combined input from both eyes. This avoids under-illumination artifacts and enhances the perceptual accuracy of the second multiscopic image without necessitating excessive adjustments or relocations in the image directed toward the determined eye.

Moreover, this approach mitigates perceptual imbalance when spatial relocation and gaze-based redirection are not feasible, particularly in safety-critical environments such as HUDs in vehicles, where stability of virtual content is vital. The adjustment is performed prior to generating the second multiscopic image, which ensures that interocular luminance relationships are preserved during multiscopic synthesis and avoids post-processing distortions. This approach also improves robustness by redirecting compensatory effort to other display sub-regions that remain intact, enabling localized defect tolerance and enhancing the perceptual resilience of the multiscopic display in real-world operating conditions.

Additionally, optionally, the at least one processor is configured to decrease the intensities of the pixels in the corresponding portion of the image to be directed toward the determined eye, prior to generating the second multiscopic image from the image to be directed toward the determined eye and the another image to be directed toward the another eye. Optionally, in this regard, the intensities of the pixels in the corresponding portion of the image are decreased and the intensities of the pixels in the portion of the another image are increased, such that a binocular sum of:

(i) a luminance of light emitted from the at least one defective sub-region toward the determined eye, and (ii) a luminance of light emitted from the non-defective sub-region toward the another eye, lies within a predefined threshold range of a target binocular luminance corresponding to a part of the at least one virtual object that is being presented via the at least one defective sub-region.

Pursuant to embodiments of the present disclosure, the target binocular luminance corresponding to said part of the at least one virtual object is a predefined value that represents an intended perceptual luminance when said part of the at least one virtual object is viewed binocularly by the at least one user. In some implementations, the target binocular luminance is derived from a rendering pipeline employed by a rendering engine. In such implementations, the target binocular luminance is assigned to said part of the at least one virtual object based on at least one of: a lighting model selected for an ambient surrounding, surface reflectance parameters of the at least one virtual object, a virtual scene in which the at least one virtual object is being presented. For example, when the at least one virtual object is rendered in a 3D environment, a luminance computed by a shader (for example, using a Lambertian or Phong model, or similar) is used as the target binocular luminance. Additionally, the target binocular luminance may be adjusted slightly in runtime based on scene-specific lighting conditions or ambient illumination if an ambient light sensor and/or a real-world-facing camera is available.

The predefined threshold range may be set based on at least one of:

Just Noticeable Difference (JND) thresholds in human vision, such that deviations are not perceptually significant;

bit-depth constraints of the multiscopic display (for example, 1 to 5 units for 8-bit representation);

tolerance limits derived during calibration or perceptual testing.

By adjusting the intensities of the pixels in such a manner, the binocular sum across both the at least one defective sub-region and the non-defective sub-region can be adjusted to lie within the perceptual threshold range from the target binocular luminance of the at least one virtual object, thereby maintaining visual coherence. This approach allows for selective redistribution of luminance load, effectively maximizing the use of display sub-regions with intact optical behaviour to preserve perceptual continuity, especially when rendering high-contrast and/or high-importance virtual content.

Because adjustments are informed by the target binocular luminance, the system maintains scene realism and material consistency even in the presence of optical defects. By adapting to perceptual luminance thresholds rather than absolute pixel intensities, this approach provides display-independent robustness, allowing the same logic to scale across devices with different bit-depths or panel technologies.

This approach supports continuous degradation handling. Even when multiple or growing defective sub-regions exist, compensation dynamically adapts to maintain binocular luminance balance without causing abrupt visual shifts.

Moreover, optionally, the binocular sum ($L_{binocular}$) is calculated using an expression:

$$L_{binocular} = \frac{L_{first}^2 + L_{second}^2}{L_{first} + L_{second}},$$

wherein:

$L_{first}$ denotes (i) the luminance of the light emitted from the at least one defective sub-region toward the determined eye, and $L_{second}$ denotes (ii) the luminance of the light emitted from the non-defective sub-region toward the another eye.

The aforementioned expression is also known as Schrödinger's equation in the context of binocular brightness perception. It will be appreciated that a person skilled in the art will recognize many variations, alternatives, and modifications of the aforesaid expression.

By calculating the binocular sum using a perceptual model such as the Schrödinger's equation, the system aligns its compensation strategy with empirically validated human vision characteristics, rather than relying solely on arithmetic or linear summation of luminance values. This improves the accuracy of luminance perception modelling, especially in multiscopic scenarios where interocular luminance asymmetries can lead to visual discomfort or depth fusion errors.

Because Schrödinger's equation accounts for a non-linear contribution of luminance from each eye, the resulting binocular sum better reflects the user's actual perceived luminance. This enables more precise control over intensity adjustments, ensuring that the compensated second multiscopic image does not produce perceptually over-bright or under-bright virtual objects, particularly in the vicinity of the at least one defective sub-region.

Furthermore, optionally, the at least one processor is configured to:

determine sub-pixels of the second multiscopic image whose light is not directed toward any of the eyes of the at least one user through a sub-region of the display area that surrounds the at least one defective sub-region, based on the at least one parameter of the multiscopic optical element and the respective optical locations of the eyes of the at least one user relative to the display area; and adjust colours and intensities of the determined sub-pixels, based on colours and intensities of pixels in a portion of the second multiscopic image to be displayed via the at least one defective sub-region.

It will be appreciated that the term "surrounds" means that the sub-region could spatially surround or be adjacent to the at least one defective sub-region. For each sub-pixel, a projected ray direction (or range of ray directions) can be computed to determine which angular zones in space the emitted light is directed toward. It will also be appreciated that, in implementations that do not employ discrete RGB sub-pixels (for example, such as time-sequential colour wheel-based displays), the term "sub-pixel" may refer to temporally distinct light-emission events corresponding to different colour channels or directions of projection.

If none of these ray directions intersect with viewing zones corresponding to the optical locations of the eyes of the at least one user, then said sub-pixel is determined to be one whose light is not directed toward any of the eyes. This determination may be performed in a ray-wise, sub-region-wise, or sampling-based manner for computational efficiency and can be updated dynamically as the user's position changes.

By determining the sub-pixels of the second multiscopic image whose light is not directed toward any of the eyes of the at least one user through the sub-region of the display area that surrounds the at least one defective sub-region, the system identifies sub-pixels that are perceptually unused under current viewing conditions. These sub-pixels correspond to angular directions not currently occupied by any eye of the at least one user, and thus do not contribute to the user's visual perception under current viewing geometry. Beneficially, these sub-pixels, often contributing to crosstalk or stray light, can be repurposed to support compensatory rendering.

By adjusting the colours and intensities of these determined sub-pixels based on the colours and intensities of the pixels in the portion of the second multiscopic image to be displayed via the at least one defective sub-region, the system effectively redistributes visual content to nearby emission directions. This allows for local optical reinforcement that can indirectly benefit the perceived output in the vicinity of the at least one defective sub-region, for example, via scatter, internal reflections, or spillover in imperfect optics. This can be used to prevent the at least one defective sub-region from appearing darker than its surroundings.

This enables spatially localized defect mitigation without altering the visual experience for the at least one user, as the adjusted sub-pixels do not contribute directly to the image perceived by any eye. It thus provides a non-intrusive mitigation mechanism that enhances visual consistency and reduces defect visibility without interfering with intended multiscopic imagery.

Moreover, this approach supports dynamic adaptation as the user's position changes. As viewing geometry evolves, previously-unused sub-pixels may become relevant again, and the system can seamlessly revert them to primary content emission, ensuring continuous optimal use of the display area while maintaining visual integrity. This also improves display efficiency by re-allocating emission capacity in a perceptually optimized manner, rather than wasting it on unused angular output.

For illustration purposes only, there will now be described how various components of the system can be implemented. The at least one processor controls an overall operation of the system. The at least one processor is communicably coupled to the tracker, the multiscopic display and the at least one camera. Optionally, the at least one processor is implemented as a processor of the multiscopic display. Alternatively, optionally, the at least one processor is implemented as a processor of a computing device that is communicably coupled to the multiscopic display. Examples of the computing device include, but are not limited to, a laptop, a desktop, a tablet, a phablet, a personal digital assistant, a workstation, and a console. Yet alternatively, optionally, the at least one processor is implemented as a cloud server (namely, a remote server) that provides a cloud computing service.

Throughout the present disclosure, the term "tracker" refers to a specialised equipment for detecting and/or tracking optical locations of eyes of a given user. In some implementations, the tracker is also used for detecting gaze directions of the user's eyes. Moreover, the tracker can also be used to determine the optical location of the at least one camera. Additionally or alternatively, the optical location of the at least one camera can be retrieved from a data repository that is communicably coupled to the at least one processor.

Optionally, the tracker is implemented as at least one tracking camera. The at least one tracking camera may comprise at least one of: at least one visible-light camera, at least one infrared (IR) camera, at least one depth camera. Examples of such a visible-light camera include, but are not limited to, a Red-Green-Blue (RGB) camera, a Red-Green-Blue-Alpha (RGB-A) camera, a Red-Green-Blue-Depth (RGB-D) camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Examples of such a depth camera include, but are not limited to, a Time-of-Flight (ToF) camera, a light detection and ranging (LIDAR) camera, a Red-Green-Blue-Depth (RGB-D) camera, a laser rangefinder, a stereo camera, a plenoptic camera, a ranging camera, a Sound Navigation and Ranging (SONAR) camera. It will be appreciated that any combination of various different types of cameras (namely, the at least one visible-light camera, the at least one IR camera, the at least one depth camera) may be utilised in the tracker. When different types of images captured by the various different types of tracking cameras are utilised, the optical location of the user's eyes can be determined highly accurately, as results obtained from one type of image can be used to refine results obtained from another type of image. Herein, these different types of images constitute the tracking data collected by the tracker, and may be in the form of at least one of: visible-light images, IR images, depth images. It will be appreciated that the tracker tracks both eyes of the at least one user with a significantly high accuracy and precision, such that an error in determining the optical location may, for example, be minimised to within a tolerance range of approximately (+/−) 8 millimetres.

Pursuant to embodiments of the present disclosure, different types of multiscopic displays can be implemented. For example, the multiscopic display can be any one of: hogel-based, lenticular array-based, parallax barrier-based. Depending on the type of the multiscopic display, the multiscopic optical element can be a lenticular array, a parallax barrier, or similar. Optionally, the at least one processor is configured to control the multiscopic optical element, based on the respective optical locations of the eyes of the at least one user with respect to the display area, to direct light produced by a first set of pixels of the multiscopic image toward a first eye, whilst directing light produced by a second set of pixels of the multiscopic image toward a second eye.

The respective images to be directed toward the eyes of the at least one user are generated or retrieved based on the respective optical locations of the eyes of the at least one user. In a case where the at least one user comprises a plurality of users, there would be a corresponding pair of respective images for each of the plurality of users. The multiscopic image may be understood to be a 2D image comprising a plurality of pixels, wherein the first set of pixels from amongst the plurality of pixels is responsible for generating a first part of a synthetic light field that corresponds to the first eye, and the second set of pixels from amongst the plurality of pixels is responsible for generating a second part of the synthetic light field that corresponds to the second eye. It will be appreciated that the pixels belonging to the first set are not arranged in a continuous manner across the multiscopic image; similarly, the pixels belonging to the second set are also not arranged in a continuous manner across the multiscopic image. Optionally, the pixels belonging to the first set and the pixels belonging to the second set are arranged in alternating vertical stripes across a horizontal field of view of the multiscopic image, wherein each vertical stripe comprises one or more lines of pixels. This is because humans perceive depth mainly based on horizontal binocular parallax. Thus, in this way, the multiscopic image would be considerably different as compared to a conventional 2D image that is displayed via conventional 2D displays, because the same multiscopic image comprises visual information corresponding to different eyes of the at least one user.

In some implementations, the at least one virtual object is a part of a virtual environment. Optionally, in such implementations, the at least one processor is configured to generate the respective images to be directed toward the eyes of the at least one user from a perspective of the respective optical locations of the eyes of the at least one user, by employing a 3D model of the virtual environment. The term "virtual object" refers to a computer-generated object (namely, a digital object). Examples of the virtual object may include, but are not limited to, a virtual navigation tool, a virtual gadget, a virtual message, a virtual entity, a virtual entertainment media, a virtual vehicle or part thereof, and a virtual information. The term "three-dimensional model" of the virtual environment refers to a data structure that comprises comprehensive information pertaining to the at least one virtual object. Such a comprehensive information is indicative of at least one of: a plurality of features of the at least one virtual object or its portions, a shape and a size of the at least one virtual object or its portions, a pose of the at least one virtual object or its portions, a material of the at least one virtual object or its portions, a colour and an optical depth of the at least one virtual object or its portions. The 3D model may be generated in the form of a 3D polygonal mesh, a 3D point cloud, a 3D surface cloud, a voxel-based model, or similar. Optionally, the at least one processor is configured to store the 3D model at the data repository. The data repository may be implemented as a memory of the at least one processor, a cloud-based database, or similar. In other implementations, the at least one processor is configured to generate the respective images to be directed toward the eyes of the at least one user in a form of 2D user interface (UI) elements. The 2D UI elements could pertain to, for example, a virtual navigation tool, a virtual gadget, a virtual message, a virtual entity, a virtual entertainment media, a virtual information, or similar.

The present disclosure also relates to the method as described above. Various embodiments and variants disclosed above, with respect to the aforementioned first aspect, apply mutatis mutandis to the method.

Optionally, the method further comprises:

when it is determined that the at least one defective sub-region overlaps at least partially with the sub-region to be used to present the at least one virtual object, determining whether a virtual depth at which the at least one virtual object is to be presented lies within a predefined threshold range from a native optical distance of the multiscopic display; and when it is determined that the virtual depth lies within the predefined threshold range from the native optical distance, generating the second multiscopic image to present the at least one virtual object at the native optical distance.

Such a visual relocation of the at least one virtual object in optical depth can be performed as an alternative to, or in combination with, spatial relocation of the at least one virtual object on the display area. This enables defect mitigation even when the another sub-region on the display area is unavailable, thereby increasing the robustness and flexibility of the defect mitigation approach. Moreover, adjusting the virtual depth instead of the spatial position preserves the spatial consistency of the scene layout from the user's perspective, contributing to a more stable and comfortable viewing experience.

Moreover, optionally, the method further comprises:

when it is determined that the at least one defective sub-region overlaps at least partially with the sub-region to be used to present the at least one virtual object, determining whether another sub-region of the display area that does not overlap with the at least one defective sub-region cannot be identified, or whether the at least one virtual object is not to be relocated; and when it is determined that another sub-region of the display area cannot be identified, or the at least one virtual object is not to be relocated, determining colours and intensities of pixels in a portion of the second multiscopic image to be displayed via the at least one defective sub-region; and adjusting the colours and intensities of said pixels, such that deviations between the adjusted colours and intensities and original colours and intensities of said pixels lie within a predefined threshold deviation.

Such adjustment enables visually acceptable rendering for multiple viewing directions, even in the presence of a defective sub-region. This approach improves local colour and intensity consistency while minimizing perceptual distortion. By minimizing cumulative perceptual deviation across multiple viewing directions, error is distributed in a visually optimal manner, reducing the likelihood of noticeable artifacts near defective sub-regions.

Furthermore, optionally, the method further comprises:

when it is determined that the at least one defective sub-region overlaps at least partially with the sub-region to be used to present the at least one virtual object, determining whether another sub-region of the display area that does not overlap with the at least one defective sub-region cannot be identified, or whether the at least one virtual object is not to be relocated; and when it is determined that another sub-region of the display area cannot be identified, or the at least one virtual object is not to be relocated, determining gaze directions of the eyes of the at least one user, using the tracker;

determining which eye of the at least one user is focused on the at least one defective sub-region, based on the gaze directions; and adjusting colours and intensities of pixels in a portion of the second multiscopic image to be displayed via the at least one defective sub-region, based on colours and intensities of pixels in a corresponding portion of an image to be directed toward the determined eye, the corresponding portion presenting the at least one virtual object.

This ensures that the visual information most likely to be scrutinized is preserved with higher fidelity, while tolerating greater deviation in the non-focused eye. Such selective and asymmetric adjustment enhances perceptual coherence without requiring spatial relocation of the at least one virtual object. This approach is particularly effective in HUDs and other automotive contexts, where critical information must remain clearly visible and stable in the user's focal field even under degraded display conditions.

Additionally, optionally, the method further comprises:

when it is determined that the at least one defective sub-region overlaps at least partially with the sub-region to be used to present the at least one virtual object, and when it is determined that another sub-region of the display area cannot be identified, or the at least one virtual object is not to be relocated, determining whether both the eyes of the at least one user are focused on the at least one defective sub-region; and when it is determined that both the eyes are focused on the at least one defective sub-region, determining a dominant eye of the at least one user; and adjusting the colours and intensities of the pixels in the portion of the second multiscopic image to be displayed via the at least one defective sub-region, based on colours and intensities of pixels in a corresponding portion of an image to be directed toward the dominant eye, the corresponding portion presenting the at least one virtual object.

This ensures that the eye contributing most strongly to perceptual interpretation receives the highest visual accuracy. This approach leverages the well-established perceptual asymmetry in binocular vision, where the dominant eye typically plays a more influential role in spatial judgment and detail recognition. As a result, visual distortion caused by optical defects is minimized in the dominant perceptual pathway, enabling more stable and coherent rendering of critical virtual content.

Moreover, optionally, the method further comprises:
when it is determined that the at least one defective sub-region overlaps at least partially with the sub-region to be used to present the at least one virtual object, and when it is determined that another sub-region of the display area cannot be identified, or the at least one virtual object is not to be relocated,
determining a portion of another image to be directed toward another eye of the at least one user, said portion presenting the at least one virtual object and being displayed via a non-defective sub-region of the display area; and
increasing intensities of pixels in said portion of the another image, prior to generating the second multiscopic image from the image to be directed toward the determined eye and the another image to be directed toward the another eye.

This facilitates a compensatory enhancement that offsets luminance distortion caused by the at least one defective sub-region. Such asymmetric intensity boosting preserves the visual prominence and clarity of the at least one virtual object, even when it cannot be relocated away from the at least one defective sub-region. Such luminance compensation leverages the principle of binocular summation, where visual perception is influenced by combined input from both eyes. This avoids under-illumination artifacts and enhances the perceptual accuracy of the second multiscopic image without necessitating excessive adjustments or relocations in the image directed toward the determined eye. This approach also improves robustness by redirecting compensatory effort to other display sub-regions that remain intact, enabling localized defect tolerance and enhancing the perceptual resilience of the multiscopic display in real-world operating conditions.

Additionally, optionally, the method further comprises decreasing the intensities of the pixels in the corresponding portion of the image to be directed toward the determined eye, prior to generating the second multiscopic image from the image to be directed toward the determined eye and the another image to be directed toward the another eye. Optionally, in this regard, the intensities of the pixels in the corresponding portion of the image are decreased and the intensities of the pixels in the portion of the another image are increased, such that a binocular sum of:
(i) a luminance of light emitted from the at least one defective sub-region toward the determined eye, and
(ii) a luminance of light emitted from the non-defective sub-region toward the another eye,
lies within a predefined threshold range of a target binocular luminance corresponding to a part of the at least one virtual object that is being presented via the at least one defective sub-region.

This approach allows for selective redistribution of luminance load, effectively maximizing the use of display sub-regions with intact optical behaviour to preserve perceptual continuity, especially when rendering high-contrast and/or high-importance virtual content. Because adjustments are informed by the target binocular luminance, the system maintains scene realism and material consistency even in the presence of optical defects.

Furthermore, optionally, the method further comprises:
determining sub-pixels of the second multiscopic image whose light is not directed toward any of the eyes of the at least one user through a sub-region of the display area that surrounds the at least one defective sub-region, based on the at least one parameter of the multiscopic optical element and the respective optical locations of the eyes of the at least one user relative to the display area; and
adjusting colours and intensities of the determined sub-pixels, based on colours and intensities of pixels in a portion of the second multiscopic image to be displayed via the at least one defective sub-region.

This repurposes perceptually-unused sub-pixels for compensatory rendering by adjusting their colours and intensities based on the pixels intended for the at least one defective sub-region, thereby redistributing visual content to nearby emission directions. This enables non-intrusive, spatially localized defect mitigation via optical reinforcement mechanisms such as scatter or internal reflections, without affecting the user's direct viewing experience.

DETAILED DESCRIPTION OF THE DRAWINGS

Figure 1B:
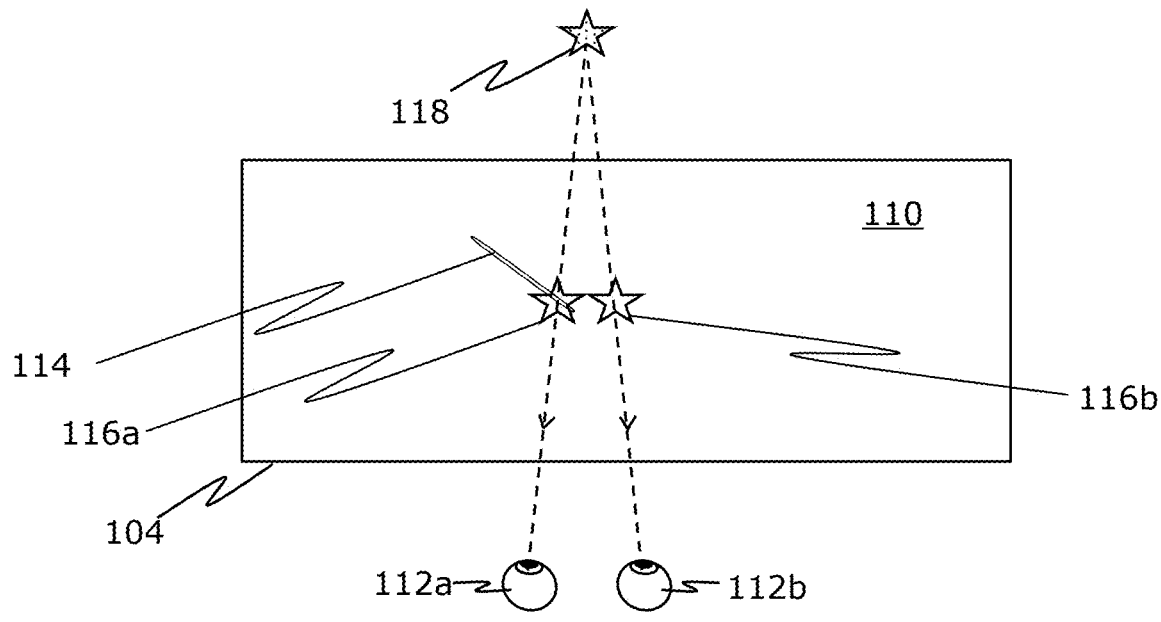

FIGS. 1A and 1B are schematic illustrations of a system 100 for detecting and mitigating defects in a multiscopic display, in accordance with an embodiment of the present disclosure. The system 100 comprises a tracker 102, a multiscopic display 104, at least one camera depicted as a camera 106, and at least one processor depicted as a processor 108. The camera 106 is positioned such that a display area 110 of the multiscopic display 104 lies within a field of view of the camera 106 at least partially. The processor 108 is configured to:
perform calibration to determine at least one parameter of a multiscopic optical element of the multiscopic display 104;
determine respective optical locations of eyes 112a-112b of at least one user relative to the display area 110, using the tracker 102;
determine or retrieve an optical location of the camera 106 relative to the display area 110;
generate or retrieve respective images to be directed toward the eyes 112a-112b of the at least one user, based on the respective optical locations of the eyes 112a-112b relative to the display area;
generate a first multiscopic image to be displayed via the multiscopic display 104, based on the respective images for the eyes 112a-112b of the at least one user, and the at least one parameter of the multiscopic optical element;
display the first multiscopic image via the multiscopic display 104, whilst capturing at least one image of the display area 110 using the camera 106;
calculate at least one expected image of the display area 110 that is expected to be captured by the camera 106 during display of the first multiscopic image, based on the first multiscopic image, the at least one parameter of the multiscopic optical element, the respective optical locations of the eyes 112a-112b relative to the display area 110, and the optical location of the camera 106 relative to the display area 110;

identify at least one defective sub-region (depicted as a defective sub-region 114) of the display area 110, based on a comparison between the at least one expected image and the at least one captured image of the display area 110;

determine whether the defective sub-region 114 overlaps at least partially with a sub-region 116a of the display area 110 to be used to present at least one virtual object (depicted as a virtual object 118), based on a location of the virtual object 118 in a second multiscopic image; and when it is determined that the defective sub-region 114 overlaps at least partially with the sub-region 116a to be used to present the virtual object 118, identify another sub-region of the display area 110 that does not overlap with the defective sub-region 114;

relocate the virtual object 118 within the second multiscopic image to use the another sub-region for presenting the virtual object 118; and display the second multiscopic image after relocating the virtual object 118.

In some cases, another sub-region of the display area 110 cannot be identified, or the virtual object 118 is not to be relocated. Optionally, in such cases, the processor 108 is configured to:

determine gaze directions of the eyes 112a-112b of the at least one user, using the tracker 102;

determine which eye of the at least one user is focused on the defective sub-region 114, based on the gaze directions.

For illustration purposes only, the eye 112a is determined to be focused on the defective sub-region 114, with reference to FIG. 1B.

Additionally, optionally, the processor 108 is configured to:

determine a portion of another image to be directed toward another eye 112b of the at least one user, said portion presenting the virtual object 118 and being displayed via a non-defective sub-region 116b of the display area 110; and increase intensities of pixels in said portion of the another image, prior to generating the second multiscopic image from the image to be directed toward the eye 112a and the another image to be directed toward the another eye 112b.

It may be understood by a person skilled in the art that FIGS. 1A and 1B include a simplified example implementation of the system 100, for sake of clarity, which should not unduly limit the scope of the claims herein. It is to be understood that a specific implementation of the system 100 is not to be construed as limiting it to specific numbers or types of trackers, multiscopic displays, cameras and processors. A person skilled in the art will recognize many variations, alternatives, and modifications of embodiments of the present disclosure. For example, the multiscopic display may be reflectively viewed via an optical combiner in some implementations.

Figure 2:
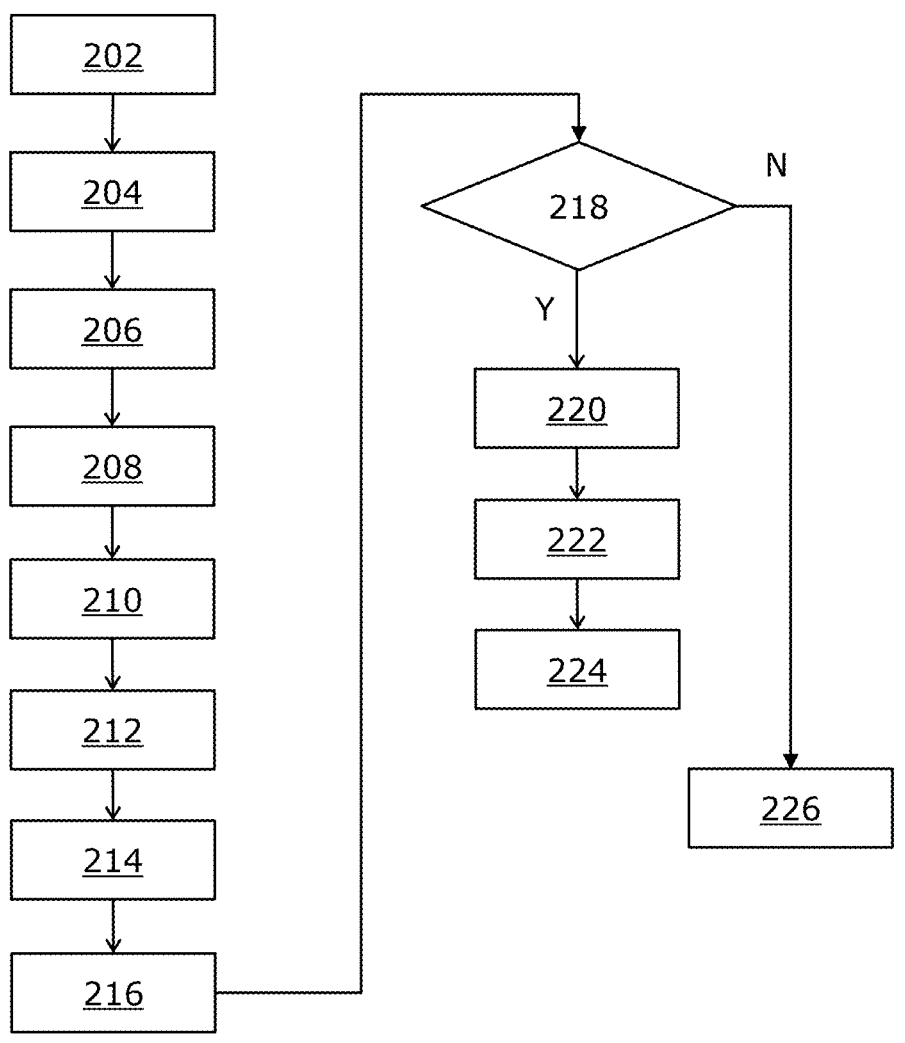
FIG. 2 illustrates steps of a method for detecting and mitigating defects in a multiscopic display, in accordance with an embodiment of the present disclosure.

Referring to FIG. 2, illustrated are steps of a method for detecting and mitigating defects in a multiscopic display, in accordance with an embodiment of the present disclosure. At step 202, calibration is performed to determine at least one parameter of a multiscopic optical element of the multiscopic display. At step 204, respective optical locations of eyes of at least one user relative to a display area of the multiscopic display are determined, using a tracker. At step 206, an optical location of at least one camera relative to the display area is determined or retrieved. At step 208, respective images to be directed toward the eyes of the at least one user are generated or retrieved, based on the respective optical locations of the eyes relative to the display area. At step 210, a first multiscopic image to be displayed via the multiscopic display is generated, based on the respective images for the eyes of the at least one user, and the at least one parameter of the multiscopic optical element. At step 212, the first multiscopic image is displayed via the multiscopic display, while capturing at least one image of the display area using the at least one camera. At step 214, at least one expected image of the display area that is expected to be captured by the at least one camera during display of the first multiscopic image is calculated, based on the first multiscopic image, the at least one parameter of the multiscopic optical element, the respective optical locations of the eyes relative to the display area, and the optical location of the at least one camera relative to the display area. At step 216, at least one defective sub-region of the display area is identified, based on a comparison between the at least one expected image and the at least one captured image of the display area. At step 218, whether the at least one defective sub-region overlaps at least partially with a sub-region of the display area to be used to present at least one virtual object is determined, based on a location of the at least one virtual object in a second multiscopic image.

When, at the step 218, it is determined that the at least one defective sub-region overlaps at least partially with the sub-region to be used to present the at least one virtual object, steps 220, 222 and 224 are performed. At step 220, another sub-region of the display area that does not overlap with the at least one defective sub-region is identified. At step 222, the at least one virtual object is relocated within the second multiscopic image to use the another sub-region for presenting the at least one virtual object. At step 224, the second multiscopic image is displayed after relocating the at least one virtual object.

Otherwise, when, at step 218, it is determined that the at least one defective sub-region does not overlap with the sub-region to be used to present the at least one virtual object, step 226 is performed. At step 226, the second multiscopic image is displayed without the need for relocating the at least one virtual object.

The aforementioned steps are only illustrative and other alternatives can also be provided where one or more steps are added, or one or more steps are provided in a different sequence without departing from the scope of the claims herein.

The invention claimed is:

1. A system comprising:
a tracker;
a multiscopic display;
at least one camera that is positioned such that a display area of the multiscopic display lies within a field of view of the at least one camera at least partially; and
at least one processor configured to:
perform calibration to determine at least one parameter of a multiscopic optical element of the multiscopic display;
determine respective optical locations of eyes of at least one user relative to the display area, using the tracker;
determine or retrieve an optical location of the at least one camera relative to the display area;

generate or retrieve respective images to be directed toward the eyes of the at least one user, based on the respective optical locations of the eyes relative to the display area;

generate a first multiscopic image to be displayed via the multiscopic display, based on the respective images for the eyes of the at least one user, and the at least one parameter of the multiscopic optical element;

display the first multiscopic image via the multiscopic display, whilst capturing at least one image of the display area using the at least one camera;

calculate at least one expected image of the display area that is expected to be captured by the at least one camera during display of the first multiscopic image, based on the first multiscopic image, the at least one parameter of the multiscopic optical element, the respective optical locations of the eyes relative to the display area, and the optical location of the at least one camera relative to the display area;

identify at least one defective sub-region of the display area, based on a comparison between the at least one expected image and the at least one captured image of the display area;

determine whether the at least one defective sub-region overlaps at least partially with a sub-region of the display area to be used to present at least one virtual object, based on a location of the at least one virtual object in a second multiscopic image; and when it is determined that the at least one defective sub-region overlaps at least partially with the sub-region to be used to present the at least one virtual object, identify another sub-region of the display area that does not overlap with the at least one defective sub-region;

relocate the at least one virtual object within the second multiscopic image to use the another sub-region for presenting the at least one virtual object; and display the second multiscopic image after relocating the at least one virtual object.

2. The system of claim 1, wherein the at least one processor is configured to:

when it is determined that the at least one defective sub-region overlaps at least partially with the sub-region to be used to present the at least one virtual object, determine whether another sub-region of the display area that does not overlap with the at least one defective sub-region cannot be identified, or whether the at least one virtual object is not to be relocated; and when it is determined that another sub-region of the display area cannot be identified, or the at least one virtual object is not to be relocated, determine colours and intensities of pixels in a portion of the second multiscopic image to be displayed via the at least one defective sub-region; and adjust the colours and intensities of said pixels, such that deviations between the adjusted colours and intensities and original colours and intensities of said pixels lie within a predefined threshold deviation.

3. The system of claim 1, wherein the at least one processor is configured to:

when it is determined that the at least one defective sub-region overlaps at least partially with the sub-region to be used to present the at least one virtual object, determine whether another sub-region of the display area that does not overlap with the at least one defective sub-region cannot be identified, or whether the at least one virtual object is not to be relocated; and when it is determined that another sub-region of the display area cannot be identified, or the at least one virtual object is not to be relocated, determine gaze directions of the eyes of the at least one user, using the tracker;

determine which eye of the at least one user is focused on the at least one defective sub-region, based on the gaze directions; and adjust colours and intensities of pixels in a portion of the second multiscopic image to be displayed via the at least one defective sub-region, based on colours and intensities of pixels in a corresponding portion of an image to be directed toward the determined eye, the corresponding portion presenting the at least one virtual object.

4. The system of claim 3, wherein the at least one processor is configured to:

when it is determined that the at least one defective sub-region overlaps at least partially with the sub-region to be used to present the at least one virtual object, and when it is determined that another sub-region of the display area cannot be identified, or the at least one virtual object is not to be relocated, determine whether both the eyes of the at least one user are focused on the at least one defective sub-region; and when it is determined that both the eyes are focused on the at least one defective sub-region, determine a dominant eye of the at least one user; and adjust the colours and intensities of the pixels in the portion of the second multiscopic image to be displayed via the at least one defective sub-region, based on colours and intensities of pixels in a corresponding portion of an image to be directed toward the dominant eye, the corresponding portion presenting the at least one virtual object.

5. The system of claim 3, wherein the at least one processor is configured to:

when it is determined that the at least one defective sub-region overlaps at least partially with the sub-region to be used to present the at least one virtual object, and when it is determined that another sub-region of the display area cannot be identified, or the at least one virtual object is not to be relocated, determine a portion of another image to be directed toward another eye of the at least one user, said portion presenting the at least one virtual object and being displayed via a non-defective sub-region of the display area; and increase intensities of pixels in said portion of the another image, prior to generating the second multiscopic image from the image to be directed toward the determined eye and the another image to be directed toward the another eye.

6. The system of claim 5, wherein the at least one processor is configured to decrease the intensities of the pixels in the corresponding portion of the image to be directed toward the determined eye, prior to generating the second multiscopic image from the image to be directed toward the determined eye and the another image to be directed toward the another eye.

7. The system of claim 6, wherein the intensities of the pixels in the corresponding portion of the image are decreased and the intensities of the pixels in said portion of the another image are increased, such that a binocular sum of:

(i) a luminance of light emitted from the at least one defective sub-region toward the determined eye, and (ii) a luminance of light emitted from the non-defective sub-region toward the another eye, lies within a predefined threshold range of a target binocular luminance corresponding to a part of the at least one virtual object that is being presented via the at least one defective sub-region.

8. The system of claim 1, wherein the at least one processor is configured to:

determine sub-pixels of the second multiscopic image whose light is not directed toward any of the eyes of the at least one user through a sub-region of the display area that surrounds the at least one defective sub-region, based on the at least one parameter of the multiscopic optical element and the respective optical locations of the eyes of the at least one user relative to the display area; and adjust colours and intensities of the determined sub-pixels, based on colours and intensities of pixels in a portion of the second multiscopic image to be displayed via the at least one defective sub-region.

9. The system of claim 1, wherein the at least one processor is configured to:

when it is determined that the at least one defective sub-region overlaps at least partially with the sub-region to be used to present the at least one virtual object, determine whether a virtual depth at which the at least one virtual object is to be presented lies within a predefined threshold range from a native optical distance of the multiscopic display; and when it is determined that the virtual depth lies within the predefined threshold range from the native optical distance, generate the second multiscopic image to present the at least one virtual object at the native optical distance.

10. A method comprising:

performing calibration to determine at least one parameter of a multiscopic optical element of a multiscopic display;

determining respective optical locations of eyes of at least one user relative to a display area of the multiscopic display, using a tracker;

determining or retrieving an optical location of at least one camera relative to the display area, wherein the at least one camera is positioned such that the display area of the multiscopic display lies within a field of view of the at least one camera at least partially;

generating or retrieving respective images to be directed toward the eyes of the at least one user, based on the respective optical locations of the eyes relative to the display area;

generating a first multiscopic image to be displayed via the multiscopic display, based on the respective images for the eyes of the at least one user, and the at least one parameter of the multiscopic optical element;

displaying the first multiscopic image via the multiscopic display, whilst capturing at least one image of the display area using the at least one camera;

calculating at least one expected image of the display area that is expected to be captured by the at least one camera during display of the first multiscopic image, based on the first multiscopic image, the at least one parameter of the multiscopic optical element, the respective optical locations of the eyes relative to the display area, and the optical location of the at least one camera relative to the display area;

identifying at least one defective sub-region of the display area, based on a comparison between the at least one expected image and the at least one captured image of the display area;

determining whether the at least one defective sub-region overlaps at least partially with a sub-region of the display area to be used to present at least one virtual object, based on a location of the at least one virtual object in a second multiscopic image; and when it is determined that the at least one defective sub-region overlaps at least partially with the sub-region to be used to present the at least one virtual object, identifying another sub-region of the display area that does not overlap with the at least one defective sub-region;

relocating the at least one virtual object within the second multiscopic image to use the another sub-region for presenting the at least one virtual object; and displaying the second multiscopic image after relocating the at least one virtual object.

11. The method of claim 10, further comprising:

when it is determined that the at least one defective sub-region overlaps at least partially with the sub-region to be used to present the at least one virtual object, determining whether another sub-region of the display area that does not overlap with the at least one defective sub-region cannot be identified, or whether the at least one virtual object is not to be relocated; and when it is determined that another sub-region of the display area cannot be identified, or the at least one virtual object is not to be relocated, determining colours and intensities of pixels in a portion of the second multiscopic image to be displayed via the at least one defective sub-region; and adjusting the colours and intensities of said pixels, such that deviations between the adjusted colours and intensities and original colours and intensities of said pixels lie within a predefined threshold deviation.

12. The method of claim 10, further comprising:

when it is determined that the at least one defective sub-region overlaps at least partially with the sub-region to be used to present the at least one virtual object, determining whether another sub-region of the display area that does not overlap with the at least one defective sub-region cannot be identified, or whether the at least one virtual object is not to be relocated; and when it is determined that another sub-region of the display area cannot be identified, or the at least one virtual object is not to be relocated, determining gaze directions of the eyes of the at least one user, using the tracker;

determining which eye of the at least one user is focused on the at least one defective sub-region, based on the gaze directions; and adjusting colours and intensities of pixels in a portion of the second multiscopic image to be displayed via the at least one defective sub-region, based on colours and intensities of pixels in a corresponding portion of an image to be directed toward the determined eye, the corresponding portion presenting the at least one virtual object.

13. The method of claim 12, further comprising:

when it is determined that the at least one defective sub-region overlaps at least partially with the sub-region to be used to present the at least one virtual object, and when it is determined that another sub-region of the display area cannot be identified, or the at least one virtual object is not to be relocated, determining whether both the eyes of the at least one user are focused on the at least one defective sub-region; and when it is determined that both the eyes are focused on the at least one defective sub-region, determining a dominant eye of the at least one user; and adjusting the colours and intensities of the pixels in the portion of the second multiscopic image to be displayed via the at least one defective sub-region, based on colours and intensities of pixels in a corresponding portion of an image to be directed toward the dominant eye, the corresponding portion presenting the at least one virtual object.

14. The method of claim 12, further comprising:

when it is determined that the at least one defective sub-region overlaps at least partially with the sub-region to be used to present the at least one virtual object, and when it is determined that another sub-region of the display area cannot be identified, or the at least one virtual object is not to be relocated, determining a portion of another image to be directed toward another eye of the at least one user, said portion presenting the at least one virtual object and being displayed via a non-defective sub-region of the display area; and increasing intensities of pixels in said portion of the another image, prior to generating the second multiscopic image from the image to be directed toward the determined eye and the another image to be directed toward the another eye.

15. The method of claim 14, further comprising decreasing the intensities of the pixels in the corresponding portion of the image to be directed toward the determined eye, prior to generating the second multiscopic image from the image to be directed toward the determined eye and the another image to be directed toward the another eye.

16. The method of claim 15, the intensities of the pixels in the corresponding portion of the image are decreased and the intensities of the pixels in the portion of the another image are increased, such that a binocular sum of:

(i) a luminance of light emitted from the at least one defective sub-region toward the determined eye, and (ii) a luminance of light emitted from the non-defective sub-region toward the another eye, lies within a predefined threshold range of a target binocular luminance corresponding to a part of the at least one virtual object that is being presented via the at least one defective sub-region.

17. The method of claim 10, further comprising:

determining sub-pixels of the second multiscopic image whose light is not directed toward any of the eyes of the at least one user through a sub-region of the display area that surrounds the at least one defective sub-region, based on the at least one parameter of the multiscopic optical element and the respective optical locations of the eyes of the at least one user relative to the display area; and adjusting colours and intensities of the determined sub-pixels, based on colours and intensities of pixels in a portion of the second multiscopic image to be displayed via the at least one defective sub-region.

18. The method of claim 10, further comprising:

when it is determined that the at least one defective sub-region overlaps at least partially with the sub-region to be used to present the at least one virtual object, determining whether a virtual depth at which the at least one virtual object is to be presented lies within a predefined threshold range from a native optical distance of the multiscopic display; and when it is determined that the virtual depth lies within the predefined threshold range from the native optical distance, generating the second multiscopic image to present the at least one virtual object at the native optical distance.

* * * * *